June 14, 1960
L. T. SMITH
2,940,467
FLOAT VALVE
Filed Feb. 4, 1958
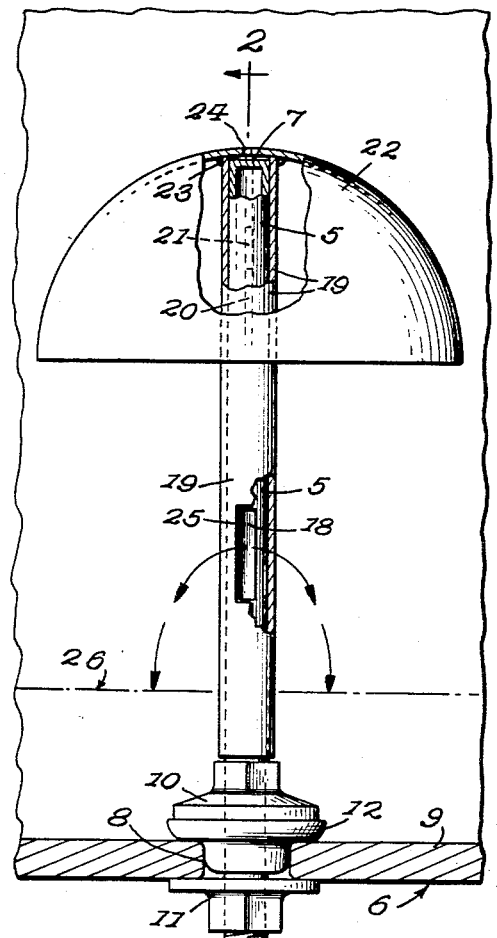
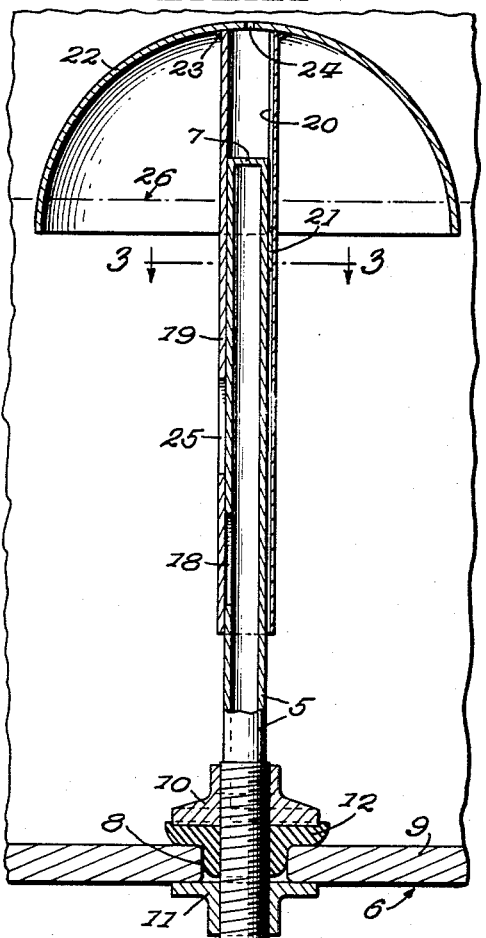
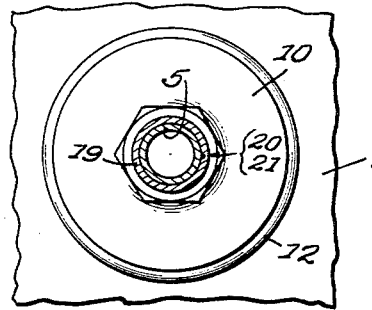
INVENTOR
Lewis T. Smith
BY Milton E. Lowry
ATTORNEY.

2,940,467

FLOAT VALVE

Lewis T. Smith, 123 N. Washington St., Enid, Okla.

Filed Feb. 4, 1958, Ser. No. 713,121

1 Claim. (Cl. 137—432)

This invention relates to a new and improved float valve for toilet flush tanks or other liquid tanks. The invention is intended primarily as a tank filling valve to close when the liquid reaches a predetermined level, but by slight modification it could well be constructed to discharge liquid from a tank when the liquid level rises to a predetermined extent.

The object of the invention is to provide an unusually simple and inexpensive yet a reliable and durable valve, the principal elements of which are a vertical inner tube for connection with the liquid supply pipe, a valve tube slidably and non-rotatably surrounding said inner tube, and a float secured to said valve tube, the two tubes being provided with liquid conducting ports for communication when the valve tube is slid to one position and for non-communication when said valve tube is slid to another position, said valve tube being movable by gravity to its lowered position and by said float to its raised position.

With the above and other objects in view that will become apparent as the nature of the invention is better understood, the same consists in the novel form, combination and arrangement of parts hereinafter more fully described, shown in the accompanying drawing, and particularly pointed out in the appended claim.

In the drawing:

Fig. 1 is a side elevation partly broken away and in section, showing a tank filling valve constructed in accordance with the invention, the valve being shown in open position;

Fig. 2 is a view partly in elevation but principally in section on line 2—2 of Fig. 1, showing the valve in closed position; and Fig. 3 is a horizontal sectional view on line 3—3 of Fig. 2.

The construction disclosed in the drawing will be rather specifically described but it is to be understood that variations may well be made. Also, attention is invited to the fact that the valve may be constructed either from metal or from a suitable plastic.

A straight elongated inner tube 5 is provided for fixed vertical disposition in a tank 6, said tube 5 having a closure 7 at its upper end. The lower end portion of the tube 5 is receivable in an opening 8 in the tank bottom 9; and upper and lower flange nuts 10 and 11 are threaded on said tube end portion, to respectively overlie and underlie said bottom 9. A gasket 12 underlies the upper flange nut 10 to prevent leakage.

The lower extremity of the tube 5 is provided with any preferred means adapting it for connection with a liquid supply pipe 13. For illustrative purposes, the tube is provided with a threaded flange 14 for engagement by a swivel nut 15 on the pipe 13. This pipe is flanged at 16 and a gasket 17 is provided for clamping between the two flanges 14 and 16.

Between the ends of the tube 5 and spaced above the upper flange nut 10, said tube is formed with a vertically elongated liquid conducting port 18.

A valve tube 19 slidably and non-rotatably surrounds the inner tube 5. Rotation of this valve tube 19 may be prevented if desired by giving the two tubes 19 and 5 a cross-sectional shape other than circular. However, it is preferable to form one tube with a longitudinal groove 20 and to provide the other tube with a projection 21 slidably received in said groove.

A float 22 is secured to the upper end of the valve tube 19; and said tube end is open to the atmosphere to allow free vertical sliding of said tube. In the present disclosure the float 22 is shown in the form of a downwardly open dome, the central portion of which spans and is secured at 23 to the upper end of the valve tube 19, said central portion having an opening 24 for placing the upper end portion of said valve tube 19 in communication with the atmosphere.

Near its lower end, the valve tube 19 is formed with a vertically elongated port 25 for communication with the port 18 of the inner tube 5 (Fig. 1) or for non-communication with said port 18 (Fig. 2), according to the position to which said valve tube 19 is slid. As the drawing discloses a tank filling valve, the two ports 18 and 25 communicate when lowering of the liquid level 26 or complete emptying of the tank 6, allows the valve tube 19 to descend by gravity to lowered position (Fig. 1); and said ports are out of communication when the liquid level 26 has been raised to the required extent and the valve tube 19 accordingly has been slid to raised position by the float 22 (Fig. 2). However, by properly locating the ports 18 and 25, the valve may be made to so function as to discharge liquid from the tank when said liquid has risen to a predetermined level.

Descent of the valve tube 19 may be limited by striking against the flange nut 10, or by striking of the dome float 22 against the inner tube 5, or in both of these ways. Ascent limiting means is not essential but could of course be provided if desired.

From the foregoing, it will be seen that a novel and advantageous construction has been disclosed for attaining the desired end. However, attention is again invited to the possibility of making variations without departing from the spirit and scope of the invention as claimed.

I claim:

A float valve assembly including an elongated tube, said tube having means intermediate its ends for mounting it on the bottom portion of a tank, said tube including an elongated aperture intermediately thereof and having a closed upper end, an elongated valve sleeve telescopically received on said tube and including an elongated intermediate aperture alignable with said aperture in said tube, said valve sleeve including a downwardly opening float shell secured to the upper end thereof and having a central small apertured portion venting the interior of said valve sleeve above the closed end of said tube at a predetermined rate, and guide means extending between the adjacent overlying surfaces of said tube and sleeve and preventing relative rotation therebetween to insure alignment of the respective apertures of the tube and sleeve.

References Cited in the file of this patent

UNITED STATES PATENTS

| 351,200 | Montgomery | Oct. 19, 1886 |
| 788,426 | Pinkerton | Apr. 25, 1905 |
| 1,163,451 | Polmann | Dec. 7, 1915 |
| 1,639,556 | Cravath | Aug. 16, 1927 |
| 2,122,866 | Lippold | July 5, 1938 |
| 2,625,950 | Clover | Jan. 20, 1953 |

FOREIGN PATENTS

| 88,714 | Sweden | Mar. 2, 1937 |
| 317,228 | Switzerland | Dec. 29, 1956 |